United States Patent
Baillon et al.

(10) Patent No.: US 8,965,603 B2
(45) Date of Patent: Feb. 24, 2015

(54) METHOD AND DEVICE FOR PROTECTING AN AIRCRAFT

(75) Inventors: Bertrand Baillon, Saubens (FR); Julien Klotz, Toulouse (FR); Laurence Mutuel, Tournefeuille (FR)

(73) Assignee: Thales, Neuilly sur Seine (FR)

( * ) Notice: Subject to any disclaimer, the term of this patent is extended or adjusted under 35 U.S.C. 154(b) by 40 days.

(21) Appl. No.: 13/701,810

(22) PCT Filed: May 24, 2011

(86) PCT No.: PCT/EP2011/058505
§ 371 (c)(1),
(2), (4) Date: Dec. 3, 2012

(87) PCT Pub. No.: WO2011/154249
PCT Pub. Date: Dec. 15, 2011

(65) Prior Publication Data
US 2013/0073124 A1    Mar. 21, 2013

(30) Foreign Application Priority Data
Jun. 11, 2010  (FR) ................................. 10 02481

(51) Int. Cl.
*B64D 43/02* (2006.01)
*G05D 1/00* (2006.01)
*B64D 45/00* (2006.01)

(52) U.S. Cl.
CPC ............ *B64D 43/02* (2013.01); *B64D 45/0005* (2013.01)
USPC .......................................................... 701/14

(58) Field of Classification Search
CPC .................................. B64D 43/02; G05D 1/00
USPC ........................................................... 340/966
See application file for complete search history.

(56) References Cited

U.S. PATENT DOCUMENTS

| 3,587,311 A | 6/1971 | Hays, Jr. |
| 4,027,839 A * | 6/1977 | Quinlivan ..................... 701/500 |
| 4,590,475 A * | 5/1986 | Brown ........................... 340/966 |
| 4,786,905 A * | 11/1988 | Muller .......................... 340/975 |
| 5,595,357 A * | 1/1997 | Catlin et al. .................... 244/1 R |
| 6,253,126 B1 | 6/2001 | Palmer |
| 6,785,594 B1 * | 8/2004 | Bateman et al. ................. 701/9 |
| 2007/0185628 A1 | 8/2007 | Delaplace et al. |
| 2008/0147255 A1 * | 6/2008 | Alwin et al. ..................... 701/14 |
| 2011/0187562 A1 * | 8/2011 | Botargues et al. ............. 340/970 |

FOREIGN PATENT DOCUMENTS

EP    1498794 A1    1/2005

* cited by examiner

*Primary Examiner* — John R Olszewski
*Assistant Examiner* — Jason Roberson
(74) *Attorney, Agent, or Firm* — Baker & Hostetler LLP

(57) ABSTRACT

A method and a device for protecting an aircraft in the flight phase, said aircraft exhibiting several configurations of slats and flaps, comprises the following steps: determining, for at least one configuration of slats and flaps, of a limit angle of incidence beyond which the aircraft runs a risk of stalling, determining a gain factor as a function of the normal acceleration of the aircraft, comparing the current angle of incidence of the aircraft with the limit angle of incidence weighted by the gain factor, and, emission of an alert indicating that the aircraft runs a risk of stalling, if the current angle of incidence of the aircraft is greater than the limit angle of incidence weighted by the gain factor.

8 Claims, 3 Drawing Sheets

METHOD AND DEVICE FOR PROTECTING AN AIRCRAFT

CROSS-REFERENCE TO RELATED APPLICATIONS

This application is a National Stage of International patent application PCT/EP2011/058505, filed on May 24, 2011, which claims priority to foreign French patent application No. FR 1002481, filed on Jun. 11, 2010, the disclosures of which are incorporated by reference in their entirety.

FIELD OF THE INVENTION

The invention relates to the protection of aircraft and more particularly, the detection of a risk of stalling.

BACKGROUND

Low-speed flight phases are dangerous for aircraft, in particular during the landing and takeoff phases where the margin for maneuver in relation to the terrain is all the more critical as the wind currents are strong and the altitude is low. To preclude abnormal changes of speed and of attitude of the airplane, onboard systems for detecting airplane stall are already known. But, at low altitude, they do not offer the pilot the possibility of sufficiently early anticipation of collision with the ground. Moreover, these stall detection systems remain simply reactive (these detection systems are triggered even though the aircraft is already in a poor posture, in contradistinction to predictive systems which are triggered before the aircraft is in danger).

Furthermore, these systems are too dependent on incidence probes. This poses a problem notably in so-called crab approach phases, that is to say in a crosswind. If the aircraft exhibits a single incidence probe situated in a zone of turbulence caused by the fuselage of the aircraft, then the incidence probe risks delivering erroneous information. This is why most aircraft have two incidence probes situated on either side of the aircraft. The angle of incidence value used by the flight management systems is then an average of the angles of incidence provided by the two probes. This arrangement limits the errors but causes discrepancies between the real value of the angle of incidence and the averaged value.

Problems with probes are at the origin of accidents occurring in so-called CFIT (Controlled Flight Into Terrain) normal approach phases, in the course of which the pilots and the flight systems fully control the aircraft but have a false idea of its situation in the vertical and/or horizontal plane. Typically, if a probe delivers erroneous information, the automatic pilot may believe that the aircraft is on the ground. The automatic pilot then cuts the engines. The pilot does not then have time to react and the aircraft stalls.

SUMMARY OF THE INVENTION

The invention is notably aimed at alleviating the problems cited above by proposing a method and a device for protecting an aircraft in the flight phase making it possible to alert a pilot of a risk of stalling of the aircraft early enough for him to be able to engage a saving maneuver.

For this purpose, the subject of the invention is a method for protecting an aircraft in the flight phase, said aircraft exhibiting several configurations of slats and flaps and comprising means for measuring its normal acceleration, said method being characterized in that it comprises the following steps:

the determination, for at least one configuration of slats and flaps, of a limit angle of incidence beyond which the aircraft runs a risk of stalling, the determination of a gain factor as a function of the normal acceleration of the aircraft, the comparison between the current angle of incidence of the aircraft, on the one hand and the limit angle of incidence weighted by the gain factor on the other hand, the aircraft flying with said configuration of slats and flaps, the emission of an alert indicating that the aircraft runs a risk of stalling, if the current angle of incidence of the aircraft is greater than the limit angle of incidence weighted by the gain factor.

The invention also relates to a device for protecting an aircraft in the flight phase, said aircraft exhibiting several configurations of slats and flaps and comprising means for measuring its normal acceleration, said device being characterized in that it comprises:

means for the determination, for at least one configuration of slats and flaps, of a limit angle of incidence beyond which the aircraft runs a risk of stalling, means for the determination of a gain factor as a function of the normal acceleration of the aircraft, means for the comparison between the current angle of incidence of the aircraft, on the one hand and the limit angle of incidence weighted by the gain factor on the other hand, the aircraft flying with said configuration of slats and flaps, means for the emission of an alert indicating that the aircraft runs a risk of stalling, if the current angle of incidence of the aircraft is greater than the limit angle of incidence weighted by the gain factor.

By using the aircraft angle of incidence information combined with a gain factor calculated on the basis of the normal acceleration of the aircraft, the invention makes it possible to detect a risk of stalling early enough for the pilot to be able to engage a saving maneuver.

The invention has the advantage of being parametrizable. Indeed, through the gain factor, it is possible to parametrize the condition for triggering the alert afforded to the pilot. This makes it possible to anticipate in a reliable manner a risk of stalling with respect to a condition relying solely on a limit value of angle of incidence.

The invention has the advantage of adapting exactly to the aerodynamic characteristics of each type of aircraft. Indeed, the angle of incidence is compared with limit angles of incidence depending on the real lift of the aircraft and its slat/flap configurations.

The invention also has the advantage of being operational in the approach phase, the cruising phase and also the takeoff phase.

BRIEF DESCRIPTION OF THE DRAWINGS

The invention will be better understood and other advantages will become apparent on reading the detailed description given by way of nonlimiting example and with the aid of the figures among which.

DETAILED DESCRIPTION

Figure 1:
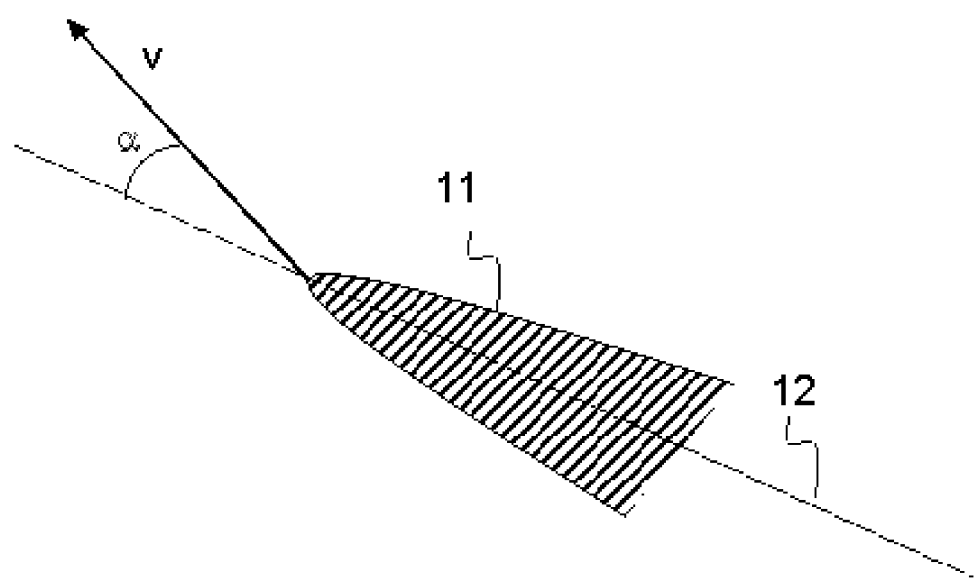
FIG. 1 represents the nose of an aircraft and its longitudinal axis.

The invention uses the angle of incidence of the aircraft to detect whether the latter is on the point of stalling. FIG. 1 represents the nose of an aircraft 11 and its longitudinal axis 12. The aircraft flies according to a speed vector V. The angle α formed between the speed vector V and the longitudinal axis 12 is called the angle of incidence. The angle of incidence is one of the parameters of the aircraft most impacted by changes of air speed.

It is recalled that the wings of the aircraft support devices allowing the piloting of the airplane: for example the slats and the flaps. A particular inclination of slats and flaps of the aircraft is called a slats/flaps configuration.

Figure 2:
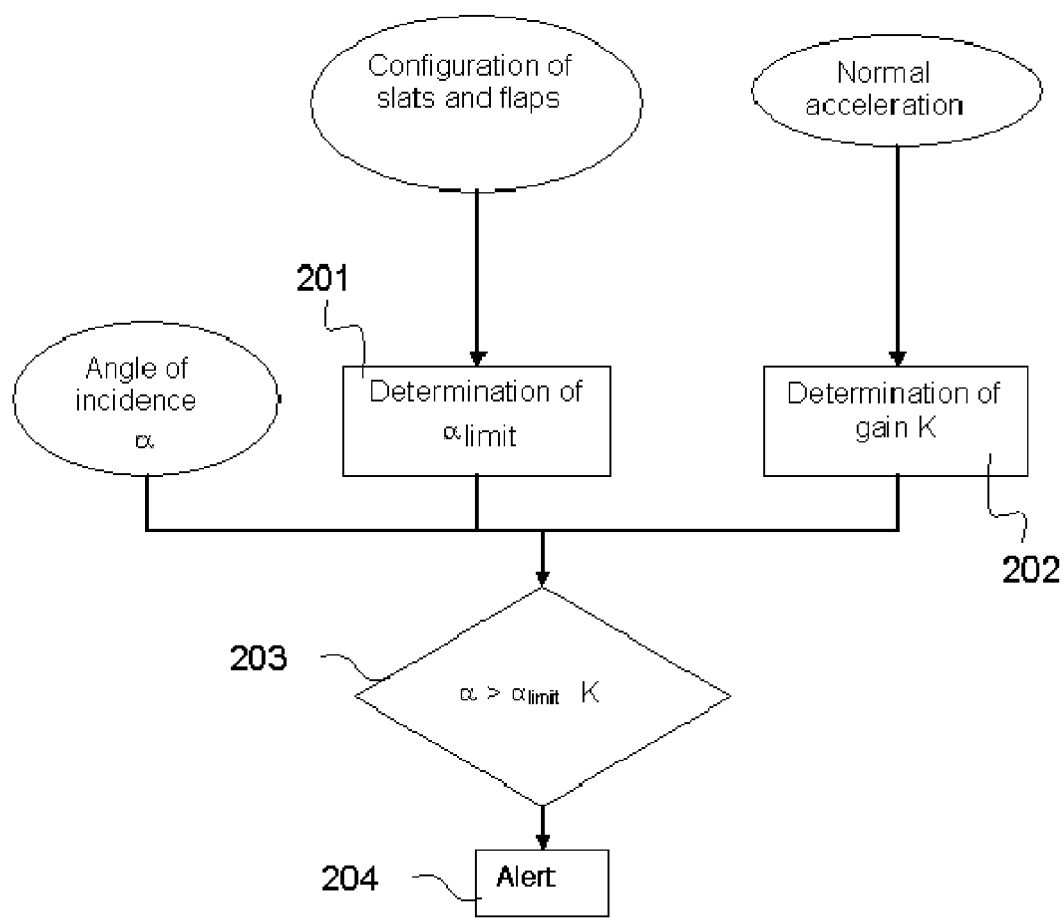
FIG. 2 represents a chart illustrating the method according to the invention.

FIG. 2 represents a chart illustrating the method according to the invention. The method according to the invention comprises the following steps:
- the determination 201, for at least one configuration of slats and flaps, of a limit angle of incidence $\alpha_{limit}$ beyond which the aircraft runs a risk of stalling,
- the determination 202 of a gain factor K as a function of the normal acceleration of the aircraft,
- the comparison 203 between the current angle of incidence α of the aircraft, on the one hand and the limit angle of incidence $\alpha_{limit}$ weighted by the gain factor K on the other hand, the aircraft flying with said configuration of slats and flaps,
- the emission 204 of an alert indicating that the aircraft runs a risk of stalling, if the current angle of incidence α of the aircraft is greater than the limit angle of incidence $\alpha_{limit}$ weighted by the gain factor K.

For a given aircraft, the value of the stall angle of incidence is determined via curves of lift coefficient as a function of angle of incidence. The stall angle of incidence corresponds to the angle for which the lift coefficient attains its maximum value. Beyond this angle, the lift decreases and the airplane is considered to be in the stall phase.

For example, for each configuration of slats and flaps, a limit angle of incidence $\alpha_{limit}$ beyond which the aircraft runs a risk of stalling is deduced from the stall angle of incidence. This limit angle of incidence is calculated for example at 1.2 times the stall speed.

The gain K, parametrizable and dependent on the normal acceleration information, serves to sensitize the limit angle of incidence $\alpha_{limit}$ depending on whether or not the aircraft is approaching the stall window. Indeed, the more the angle of attack of the aircraft tends to the stall angle of attack, the more the lift increases. An increase in lift (and therefore the appearance of a nonzero normal acceleration) while the air speed of the aircraft is low, is characteristic of the approach to the stall zone.

Advantageously, the method according to the invention furthermore comprises a step of deactivating the alert if the current altitude of the aircraft is greater than a predetermined limit altitude.

Advantageously, the method according to the invention furthermore comprises a step of deactivating the alert if the current speed of the aircraft is greater than a predetermined limit speed.

False alerts constitute a recurring problem on the known monitoring systems. These various deactivation steps (as a function of altitude or of speed) have the advantage of limiting false alerts.

Figure 3:
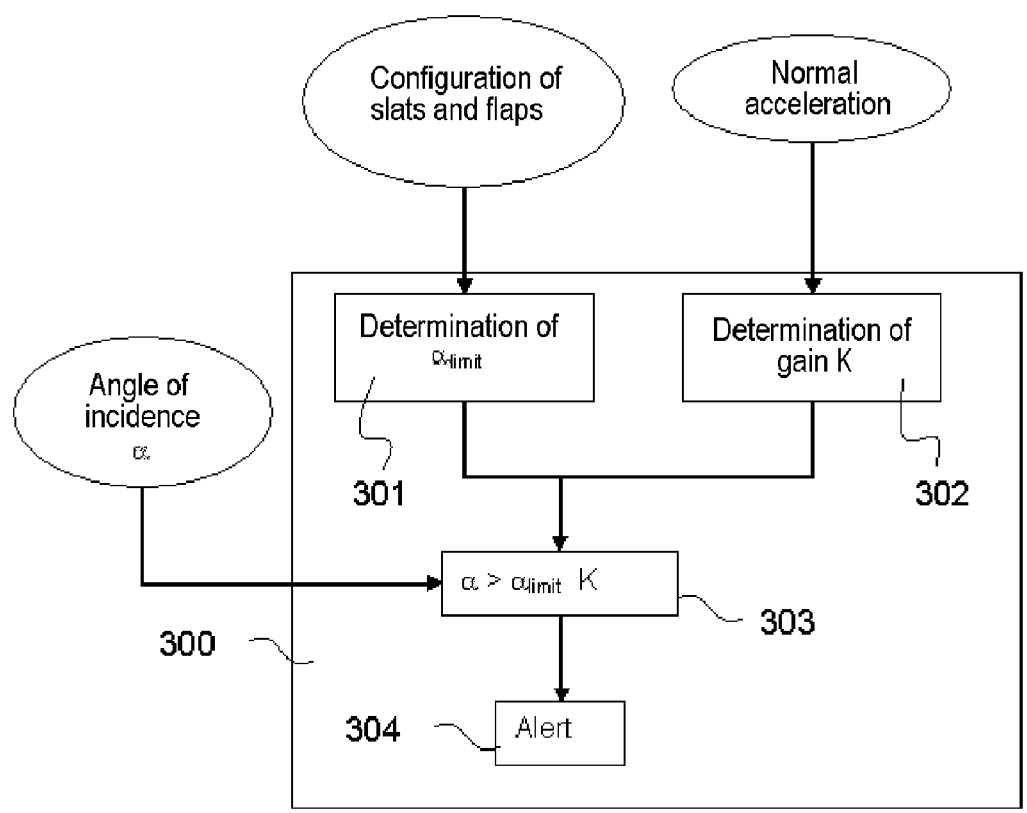
FIG. 3 represents an exemplary implementation of the device according to the invention.

The invention also relates to a device for protecting an aircraft in the flight phase. FIG. 3 represents an exemplary implementation of the device according to the invention.

The device 300 comprises:
- means 301 for the determination, for at least one configuration of slats and flaps, of a limit angle of incidence $\alpha_{limit}$ beyond which the aircraft runs a risk of stalling,
- means 302 for the determination of a gain factor K as a function of the normal acceleration of the aircraft,
- means 303 for the comparison between the current angle of incidence α of the aircraft, on the one hand and the limit angle of incidence $\alpha_{limit}$ weighted by the gain factor K on the other hand, the aircraft flying with said configuration of slats and flaps,
- means 304 for the emission of an alert indicating that the aircraft runs a risk of stalling, if the current angle of incidence α of the aircraft is greater than the limit angle of incidence $\alpha_{limit}$ weighted by the gain factor K.

Advantageously, the device according to the invention furthermore comprises means for deactivating the alert means 304 if the current altitude of the aircraft is greater than a predetermined limit altitude.

Advantageously, the device according to the invention furthermore comprises means for deactivating the alert means 304 if the current speed of the aircraft is greater than a predetermined limit speed.

The current altitude, the current speed the current angle of incidence are parameters given by various sensors of the aircraft and consolidated by the flight management systems of the aircraft.

The invention claimed is:

1. A method for protecting an aircraft in flight phase, said aircraft exhibiting several configurations of slats and flaps and comprising means for measuring a normal acceleration of said aircraft, said method comprising:
   determining a current configuration of slats and flaps,
   determining, a limit angle of incidence beyond which the aircraft runs a risk of stalling, as a function of said current configuration of slats and flaps,
   determining a gain factor as a function of the measured normal acceleration of the aircraft, the gain factor variation as a function of the normal acceleration being predetermined and parameterizable,
   comparing a current angle of incidence of the aircraft with the limit angle of incidence weighted by the gain factor, the aircraft flying with said current configuration of slats and flaps,
   emitting an alert indicating that the aircraft runs a risk of stalling, if the current angle of incidence of the aircraft is greater than the limit angle of incidence weighted by the gain factor.

2. The method for protecting an aircraft as claimed in claim 1, further comprising a step of deactivating the alert if the current altitude of the aircraft is greater than a predetermined limit altitude.

3. The method for protecting an aircraft as claimed in claim 1, further comprising a step of deactivating the alert if the current speed of the aircraft is greater than a predetermined limit speed.

4. A device for protecting an aircraft in the flight phase, said aircraft exhibiting several configurations of slats and flaps and comprising an acceleration measurement device configured to measure normal acceleration of said aircraft, said device comprising:
   a limit angle determination device, for at least one configuration of slats and flaps, configured to determine a limit angle of incidence beyond which the aircraft runs a risk of stalling,
   a gain factor determination device configured to determine a gain factor as a function of the measured normal acceleration of the aircraft, the gain factor variation as a function of the normal acceleration being predetermined and parameterizable, a comparison device configured to compare a current angle of incidence of the aircraft and the limit angle of incidence weighted by the gain factor, the aircraft flying with said configuration of slats and flaps, and an alert emitter configured to generate an alert indicating that the aircraft runs a risk of stalling, if the current angle of incidence of the aircraft is greater than the limit angle of incidence weighted by the gain factor.

5. The device for protecting as claimed in claim 4, further comprising a deactivation device configured to deactivate the alert emitter if a current altitude of the aircraft is greater than a predetermined limit altitude.

6. The method for protecting an aircraft as claimed in claim 2 further comprising a step of deactivating the alert if the current speed of the aircraft is greater than a predetermined limit speed.

7. The device for protecting as claimed in claim 4, further comprising a deactivation device configured to deactivate the alert emitter if the current altitude of the aircraft is greater than a predetermined limit altitude and if a current speed of the aircraft is greater than a predetermined limit speed.

8. The device for protecting as claimed in claim 5, further comprising a deactivation device configured to deactivate the alert emitter if the current altitude of the aircraft is greater than a predetermined limit altitude and if a current speed of the aircraft is greater than a predetermined limit speed.

\* \* \* \* \*